United States Patent [19]

Bordo et al.

[11] Patent Number: 5,237,455
[45] Date of Patent: Aug. 17, 1993

[54] OPTICAL COMBINER WITH INTEGRAL SUPPORT ARM

[75] Inventors: Robert A. Bordo, Mt. Clemens; Edwin D. Lorenz, Grand Blanc, both of Mich.; Charles M. Enderby, Arcadia, Ind.

[73] Assignee: Delco Electronics Corporation, Kokomo, Ind.

[21] Appl. No.: 802,920

[22] Filed: Dec. 6, 1991

[51] Int. Cl.⁵ .................. G02B 27/14; G02B 7/00; G02B 1/04
[52] U.S. Cl. .................. 359/632; 359/602; 359/613
[58] Field of Search ............... 359/632, 633, 631, 602, 359/603, 613

[56] References Cited

U.S. PATENT DOCUMENTS

| | | | |
|---|---|---|---|
| 2,683,498 | 7/1954 | Van Schaack | 359/613 |
| 3,816,005 | 6/1974 | Kirschner | 356/251 |
| 3,824,535 | 7/1974 | Rover, Jr. | 340/72 |
| 3,885,095 | 5/1975 | Wolfson et al. | 178/7.88 |
| 4,380,369 | 4/1983 | Schacht | 359/842 |
| 4,447,128 | 5/1984 | Ferrer | 350/174 |
| 4,600,271 | 7/1986 | Boyer et al. | 350/174 |
| 4,632,508 | 12/1986 | Connelly | 350/174 |
| 5,028,119 | 7/1991 | Hegg et al. | 350/174 |

OTHER PUBLICATIONS

V H D S—Vehicle Head-Up Display IAI/MLM Sales Literature.
V H D S—Vehicle Head-Up Display System—IAI/MLM Sales Literature.

*Primary Examiner*—Jon W. Henry
*Attorney, Agent, or Firm*—Anthony Luke Simon

[57] ABSTRACT

A combiner for a head-up display apparatus is integrally molded with a support for the combiner into a single piece. A baffle preventing direct occupant viewing of the display source of the head-up display may also be integrally molded for the combiner and the support. The integrally molded combiner and support provides for improved quality of the head-up display at a reduced price.

3 Claims, 2 Drawing Sheets

OPTICAL COMBINER WITH INTEGRAL SUPPORT ARM

This invention relates to vehicle display systems, and more particularly to projected displays for communicating information to vehicle operators, such displays being commonly known as head-up displays.

BACKGROUND OF THE INVENTION

Head-up displays have long been used in airplanes to aid the pilots. The head-up display reflects information the pilot needs off of a partial mirror or the windshield (combiner) and projects that information at a distance in front of the plane so that the pilot does not have to look into the cockpit to see the information.

More recently, head-up displays have been used in automotive applications in which the image is projected up and reflected off of the vehicle front windshield, to appear at a distance in front of the driver in combination with scenery forward of the vehicle. With a head-up display in a vehicle, the driver does not have to adjust his/her eyes from the road to read information, such as vehicle speed, which is normally displayed in the vehicle instrument panel.

When the windshield is used as a combiner, a bit of complexity is added to the system. Vehicle windshields are imperfect optical elements in that they are aspherical and that they ave two reflecting surfaces, tending to cause ghost images, resulting in a projected display appearing as a double image. Corrections for these imperfections add cost and complexity to the system. For example, in some systems, an aspheric mirror is used to compensate for the aspheric curvature of the windshield so that a clear image is produced. However, for every vehicle with a different windshield design, a new aspheric mirror design must be developed, adding expense when expanding the head-up display system to new vehicle models.

When a combiner separate from the windshield is used, the complexities caused by the vehicle windshield are eliminated. However, previous head-up displays including a combiner separate from the windshield have so far not been widely used by vehicle manufacturers for bulk, style and other reasons. One of these other reasons is the expense required with systems that include numerous parts.

SUMMARY OF THE PRESENT INVENTION

This invention provides an integral combiner and support that may be implemented in a head-up display unit suitable for automotive applications. The preferred head-up display system in which this invention is implemented uses an optical powered combiner to project typical vehicle instrument cluster information for viewing by an occupant of the vehicle. The combiner may be adjustable to accommodate various occupant eye positions and may be stowed away while the head-up display is not in use. The combiner may alternatively by fixedly mounted via the integral support.

The apparatus of this invention reduces the number of parts required for the head-up display system by integrating into a single molded piece the combiner and the support for the combiner. This reduction in the number of parts required for the head-up display system provides a more cost efficient system. In addition, quality control is improved through reduction of parts required to fit together.

Implementation of the apparatus of this invention into a head-up display system provides the vehicle occupant with a brighter, clearer image and no double image is apparent to the vehicle occupant. The simplicity of the design of this invention allows high volume low cost production.

Structurally, the apparatus of this invention comprises a singularly molded piece including both an optical combiner for a head-up display system and a support for the optical combiner, wherein the support may be directly mounted to a housing or other mount.

DETAILED DESCRIPTION OF THE INVENTION

Figure 1:
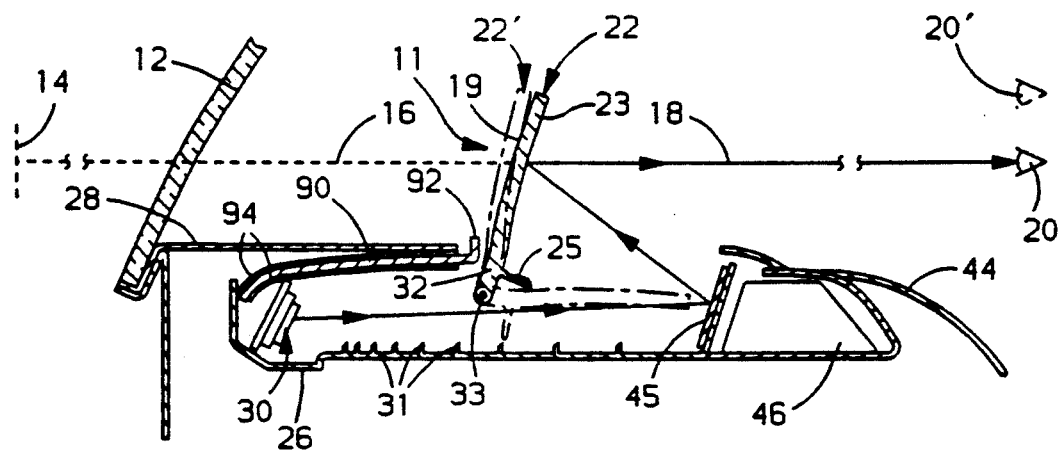
FIG. 1 is an illustration of an example implementation of this invention in a head-up display system.
Figure 6:
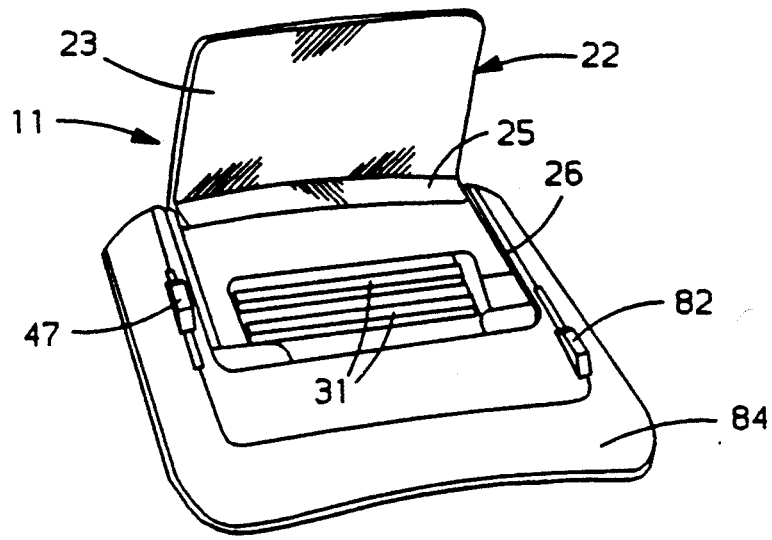
FIG. 6 is an illustration of an example of this invention in a head-up display system suitable for implementation in a variety of vehicles.

Referring to FIG. 1, the implementation of this invention into a head-up display apparatus shown includes image source 30, fold mirror 45 and an example integral combiner and support of this invention 11, all mounted within the head-up display housing 26. The head-up display housing 26 may be integrally constructed within the top of the vehicle instrumentation housing 28 and 44 as shown, or the head-up display housing 26, may be a self contained unit, such as shown in FIG. 6, suitable for mounting onto the top of a variety of vehicle instrumentation housings.

The image source 30 is preferably a high brightness vacuum fluorescent display. The image source 30 emits light which travels along light path 18 to fold mirror 45. Baffles 31 along the bottom of head-up display housing 26 prevent multiple reflections of image source 30 from being reflected off of the bottom of housing 26. The light in light path 18 is reflected off of fold mirror 45, which preferably has 92% front surface reflectivity for 45 degree incident angle light in the 450 to 650 nm band-width and is easily implemented by one skilled in the art. The light reflects from fold mirror 45 to combiner 22, which reflects or collimates the light along path 18 to the eye 20 of a vehicle occupant. The vehicle occupant perceives a virtual image 14 of the image source 30 at a distance, preferably at least two meters, in front of the occupant's eye 20, in the direction of line 16. The image 14 appears to the occupant to be floating in front of the vehicle windshield 12, preferably just above the front of the vehicle hood. Combiner 22 has a spherical concave shape, giving the combiner optical power to magnify and project the virtual image 14 at the proper distance. An example radius for combiner 22 is 732 mm +/− 10 mm. The surfaces of combiner 22 closest to eye 20 and furthest from eye 20 are preferably of polished quality, which is easily achieved by one skilled in the art without further instruction herein.

The combiner 22 described above preferably has a reflective coating 23 on the surface closest to eye 20. The reflective coating may be any of the suitable reflection enhancive coatings well known to those skilled in the art. Preferably, the reflective coating has 70% transmissivity and 28% reflectivity at 450 to 650 nm light. The coating may be applied to combiner 22 through any suitable process, including vacuum forming. The surface 19 of combiner 22 furthest from eye 20 is coated with a similarly applied anti-reflective coating preferably having less than 1% reflectivity for 525 nm of light, to prevent the occurrence of double images. Example reflective coatings are a thin film of aluminum, titanium dioxide, bismuth oxide, or indium oxide. An example anti-reflective coating may be magnesium fluoride. Alternatively, the combiner 22 may implement any known technique of improved image projection or color selective reflection, including diffractive optics, holography, interference coatings and tinting, correlated with a specific color of the image source 30 if necessary.

Figure 4:
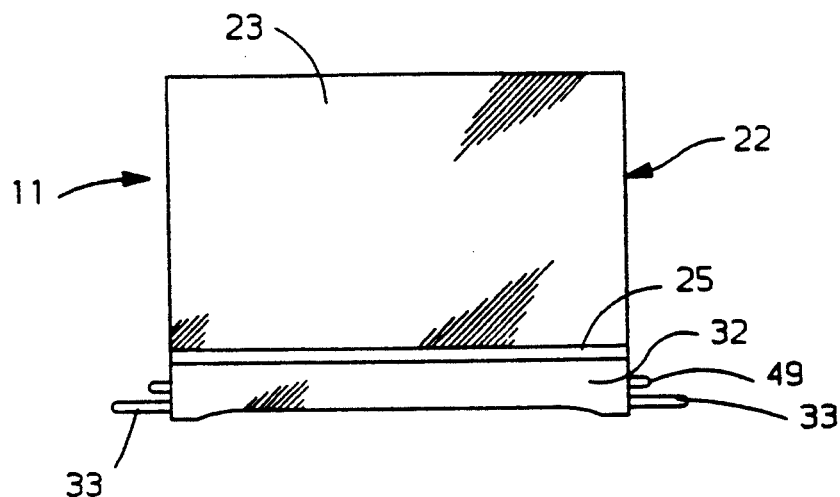
FIG. 4 is an illustration of a view of the integral combiner and support arm apparatus of this invention.

The combiner 22 is part of a single piece, the integral combiner and support 11, including support arms 32 and, preferably, baffle 25. The integral combiner and support arm 11 may be molded from any substance which can be made substantially transparent with a partial reflective surface of the type used in head-up display applications while retaining structural integrity. The preferred material for integral combiner and support 11 is polycarbonate acrylic. Baffle 25 is preferably included integral combiner and support 11 and is integrally molded therein and preferably painted black. The length and angle of baffle 25 will very from implementation to implementation, depending upon the position of a typical occupant eye 20. Those skilled in the art can easily implement a baffle 25 according to this invention to shield eye 20 from direct view of image source 30. FIG. 4 shows a view of the integral combiner and support 11, including combiner 22, baffle 25, support arms 32, and pivot pins 33. Support arms 32 are pivotably mounted at pivot pins 33 to head-up display housing 26.

Figure 2:
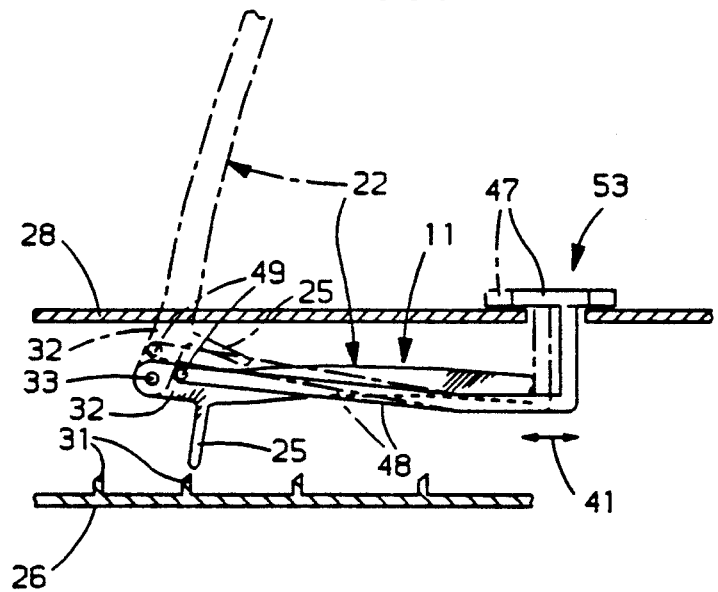
FIG. 2 is an illustration of an example mechanism for extending and retracting the integral combiner and support arm apparatus of this invention.
Figure 5:
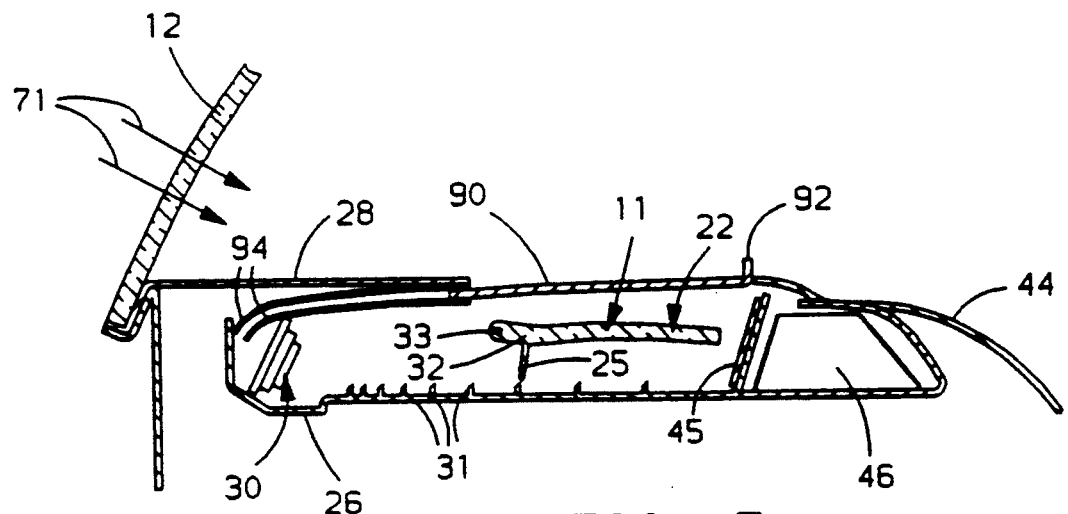
FIG. 5 is an illustration of the example head-up display system implementing this invention with the integral combiner and support arm apparatus in the retracted position.

One of the support arms 32 of integral combiner and support 11 is pivotably attached to a means mounted within head-up display housing 26 for adjusting position of the combiner. The position adjusting means also controls whether the combiner 22 is in the extended position as shown here or in the retracted position as shown in FIG. 5. An example of the position adjusting means is sliding lever and rod apparatus 53 shown in FIG. 2. The lever 47, which is attached to connecting rod 48, is slidable in the direction or arrows 41, in order to extend or retract connecting rod 48. With the connecting rod 48 pivotably attached at point 49 to one of the support arms 32, the position of the support arms 32 together with that of combiner 22, is adjusted with the extension and retraction of connecting rod 48.

For different vehicle occupants, the eye 20 may be at different vertical positions, e.g., eye 20', depending upon the size of the occupant and the height adjustment of the vehicle seat. The position of the combiner 22 is easily adjusted through lever 47 for various extended positions to accommodate various vertical positions of eye 20. When eye 20 is at higher vertical positions, the lever 47 is positioned by a vehicle occupant so that connecting rod 48 is further extended, tilting back combiner 22 so that image 14 may be seen. For example, reference 22' indicates a combiner position suitable for an operator with an eye 20', which has a higher vertical position than eye 20. Conversely, when eye 20 is at a lower vertical position, the lever 47 is positioned so that connecting rod 48 is retracted somewhat allowing image 14 to be seen by the occupant.

Referring again to FIG. 1, the image source 30 is shown mounted at an angle so that projected image 14 appears in a plane orthogonal to line 16. Proper image source angular positioning is easily achieved by one skilled in the art through simple angle adjustment of image source 30 until the image 14 is oriented as desired.

The image source 30 is driven by driver electronics 46, which are standard and easily implemented by those skilled in the art to drive the type of image source used. Signals may be transferred between driver electronics 46 and image source 30 through any acceptable means, including a circuit board and/or electrical cable.

Figure 3:
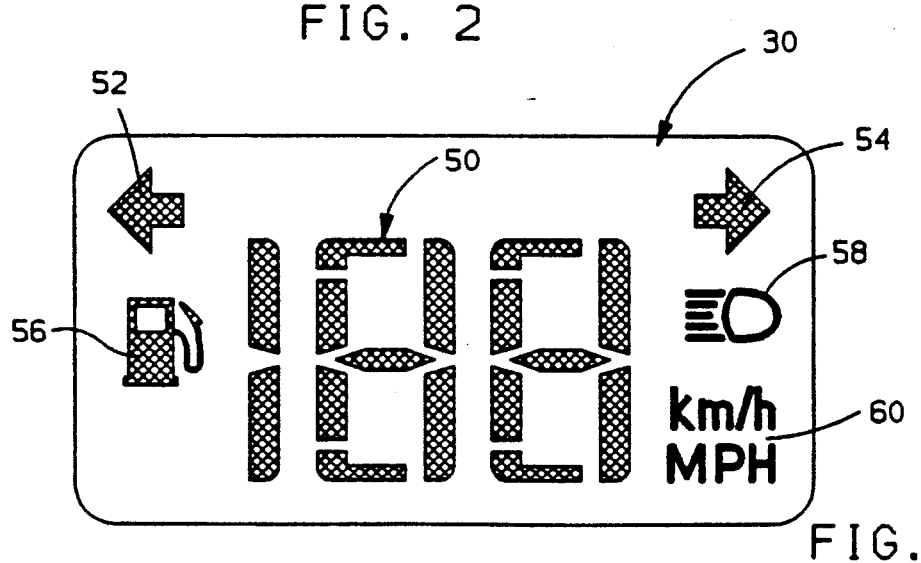
FIG. 3 is a illustration of an example display source for use with this invention.

Referring to FIG. 3, the image source 30 (FIG. 1) for the preferred implementation of the invention includes a digital speedometer 50, turn signal indicators 52 and 54, a low fuel indicator 56, a high beam indicator 58, and a speedometer scale indicator 60.

Referring again to FIG. 1, the driver electronics 46 receives information of data to be displayed by image source 30 in a conventional manner well known to those skilled in the art. For example, electrical signals may be provided by a variety of conductors, carrying signals such as the ignition voltage, ground, parking light dimming signal, HUD dimming signal, low fuel signal, right turn signal, left turn signal, high beam signal, English/metric signal, and serial vehicle speed signal. The serial speed signal may be int he form of pulses, for example 4000 pulses per mile. The display driver circuit 46 uses these signals to drive the image source 30 and is easily implemented by one skilled in the art. A dimming switch (e.g., switch 82, FIG. 6) may be implemented, in a manner known by those skilled in the art to control image source brightness.

Referring to FIG. 5, the head-up display apparatus from FIG. 1 is shown with the integral combiner and support 11 in the retracted position, for when the head-up display apparatus is not in use. The retracted position is achieved through sliding lever 47 (FIG. 2) towards eye 20. With the combiner 22 in the retracted position as shown, cover 90 prevents reflections of sun light 71 to the eye 20 of the vehicle occupant.

Cover 90 may be molded from generally opaque semi-flexible plastic and has a non-reflective upper surface. The sides of cover 90 are slidably mounted in guides 94, which are mounted in housing 26. The cover may be extended as shown here when the head-up display unit is not in use and may be retracted as shown in FIG. 1 when the head-up display unit is in use. An operator may manually extend and retract cover 90 using handle 92.

Referring to FIG. 6, the head-up display apparatus in which this invention is implemented may be a modular unit self contained within head-up display housing 26 having a housing cover 84 for styling purposes. The unit shown may be secured on top of any instrumentation enclosure and is ready for operation upon completion of the electrical connections described above, which are easily implemented by one skilled in the art.

The example shown in FIG. 6 includes lever 47. By sliding lever 47 towards the combiner 22, the combiner is extended into the position shown. Further sliding of lever 47 in the same direction adjusts the image for view by occupants with a higher vertical eye position. By sliding lever 47 away from combiner 22, combiner 22 is retracted. Sliding switch 82 shown may be used to control image brightness.

The above illustrated apparatus of this invention sets forth the preferred embodiment of the optical combiner with integral support arm. In the above example, the support 32 includes pivot pins 33 for pivotably mounting the integral combiner and support 11. Other implementations which fall within the scope of this invention include an optical combiner with integral support arm in which the support arm is molded to be fixedly mounted. In this case, the support arm can be in the shape of any suitable bracket which can be molded from a suitable substance and is suitable for mounting the integral combiner and support.

The above examples are illustrated with a vacuum fluorescent display image source. However, this invention may be used with any suitable image source, including analog image sources, LCD images sources, CRT image sources and high brightness LED image sources. Additionally, any configuration of the image source which may be desired by a system designer may be used with this invention. For example, additional telltales or an analog or digital tachometer may be implemented as part of the image source. Additionally, mirror 45 is not necessary as the image source 30 may be mounted where mirror 45 is located in FIG. 1. In this case, the image source 30 must be inverted so that a correct image appears to the vehicle occupant. Further implementations may include two or more fold mirrors to accommodate different positioning of image source 30. Also, refractive lenses may be used to alter image projection characteristics.

The above example implementations of this invention are not meant to be limiting in the scope of this invention. Moreover various improvements and modifications to this invention may occur to those skilled in the art and will fall within the scope of this invention as set forth below.

The embodiments of the invention in which an exclusive property or privilege is claimed are defined as follows:

1. An apparatus comprising a single molded piece for a head-up display apparatus, the single molded piece including:
   an optical combiner for the head-up display apparatus;
   a support for the optical combiner; and
   a baffle for preventing direct viewing of an image source by an occupant eye, wherein the single molded piece may be mounted via the support.

2. A head-up display apparatus wherein a combiner is integrally molded with a support for the combiner into a single piece and wherein a baffle is integrally molded with the combiner and the support into the single piece.

3. An apparatus comprising a single molded polycarbonate acrylic piece for a head-up display apparatus, the single molded piece including:
   an optical combiner for the head-up display apparatus including a first surface closest to an occupant eye and second surface furthest from the occupant eye, and wherein the first surface is coated with a reflective coating and the second surface is coated with an anti-reflective coating;
   a support for the optical combiner, wherein the single molded piece may be mounted via the support;
   means for pivotably mounting the single molded piece; and
   a baffle for preventing direct view of an image source by an occupant eye.

* * * * *